United States Patent
Goeb et al.

(10) Patent No.: US 6,350,823 B1
(45) Date of Patent: *Feb. 26, 2002

(54) PAVEMENT MARKING COMPOSITION

(75) Inventors: Siegfried Rainer Goeb, Willich; Anja Christina Rohmann, Moers, both of (DE)

(73) Assignee: 3M Innovative Properties Company, St. Paul, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/166,657

(22) Filed: Oct. 5, 1998

(51) Int. Cl.$^7$ ............... C09D 175/02; C09D 175/16

(52) U.S. Cl. ............... 525/455; 525/452; 525/920; 523/172; 427/137

(58) Field of Search ............... 525/452, 455, 525/920; 427/137; 523/172

(56) References Cited

U.S. PATENT DOCUMENTS

| | | | |
|---|---|---|---|
| 2,897,732 A | 8/1959 | Shuger | 94/1.5 |
| 2,897,733 A | 8/1959 | Shuger | 94/1.5 |
| 3,326,098 A | 6/1967 | Boettler | 94/22 |
| 3,814,776 A | 6/1974 | Fischer et al. | 260/309.5 |
| 3,939,126 A | 2/1976 | Carder et al. | 260/77.5 |
| 4,076,671 A | 2/1978 | Bright | 260/28.5 AV |
| 4,088,633 A | 5/1978 | Gurney | 260/47 EN |
| 4,105,808 A | 8/1978 | McKenzie | 427/137 |
| 4,185,132 A | 1/1980 | Gurney | 427/137 |
| 4,255,468 A | 3/1981 | Olson | 427/137 |
| 4,721,751 A | 1/1988 | Schappert et al. | 524/773 |
| 4,758,469 A | 7/1988 | Lange | 428/325 |
| 4,822,841 A | 4/1989 | Murray et al. | 524/356 |
| 4,906,716 A | 3/1990 | Yang et al. | 526/307.2 |
| 5,093,386 A | 3/1992 | Bishop et al. | 522/96 |
| 5,126,170 A | 6/1992 | Zwiener et al. | 427/385.5 |
| 5,128,432 A | 7/1992 | Meixner et al. | 528/49 |
| 5,146,531 A | 9/1992 | Shustack | 385/128 |
| 5,236,741 A | 8/1993 | Zwiener et al. | 427/385.5 |
| 5,247,048 A | 9/1993 | Meixner et al. | 528/49 |
| 5,254,611 A | 10/1993 | McDermott | 524/198 |
| 5,290,663 A | 3/1994 | Huynh-Tran | 430/284 |
| 5,300,615 A | 4/1994 | Meixner et al. | 528/49 |
| 5,328,805 A | 7/1994 | Huynh-Tran et al. | 430/284 |
| 5,334,654 A | 8/1994 | Starner et al. | 524/849 |
| 5,344,490 A | 9/1994 | Roosen et al. | 106/778 |
| 5,412,056 A | 5/1995 | Zwiener et al. | 528/73 |
| 5,475,038 A | 12/1995 | Skoultchi | 522/96 |
| 5,478,596 A | 12/1995 | Gurney | 427/137 |
| 5,516,346 A | 5/1996 | Cadien et al. | 51/308 |
| 5,516,873 A | 5/1996 | Hicks et al. | 528/60 |
| 5,527,853 A | 6/1996 | Landy et al. | 524/521 |
| 5,559,204 A | 9/1996 | Squiller et al. | 528/84 |
| 5,561,214 A | 10/1996 | Yeske et al. | 528/363 |
| 5,578,693 A | 11/1996 | Hagstrom et al. | 528/75 |
| 5,580,945 A | 12/1996 | Wade et al. | 528/49 |
| 5,597,930 A | 1/1997 | Wicks et al. | 548/314.1 |
| 5,616,630 A | 4/1997 | Heinze | 522/96 |
| 5,623,045 A | 4/1997 | Zwiener et al. | 528/68 |
| 5,658,672 A | 8/1997 | Lenke et al. | 428/423.1 |
| 5,709,908 A | 1/1998 | Gurney | 427/137 |
| 5,731,369 A | 3/1998 | Mahoney | 523/468 |
| 5,741,872 A | 4/1998 | Smith | 526/301 |
| 5,747,551 A | 5/1998 | Lewandowski et al. | 522/95 |
| 5,750,191 A | 5/1998 | Hachey et al. | 527/163.4 |
| 5,767,220 A | 6/1998 | Venham et al. | 528/49 |
| 5,774,265 A | 6/1998 | Mathers et al. | 359/539 |
| 5,959,775 A | 9/1999 | Joseph et al. | 359/538 |

FOREIGN PATENT DOCUMENTS

| | | | |
|---|---|---|---|
| CA | 2174383 | 4/1996 | C09J/175/08 |
| DE | 30 45 587 C2 | 6/1982 | C09D/3/72 |
| DE | 40 27 743 A1 | 3/1992 | C08G/18/73 |
| DE | 44 15 778 A1 | 11/1995 | B05D/7/16 |
| DE | 197 17 427 A1 | 1/1998 | C07C/229/02 |
| DE | 197 01 835 | 7/1998 | C08G/18/32 |
| EP | 0 093 373 | 11/1983 | A61K/9/06 |
| EP | 0 499 326 B1 | 8/1992 | C09D/5/00 |
| EP | 0 547 462 B1 | 6/1993 | C08G/18/67 |
| EP | 0 599 461 B1 | 6/1994 | C08F/299/00 |
| EP | 0 403 921 B1 | 11/1994 | C08G/18/32 |
| EP | 0 626 430 A1 | 11/1994 | C09D/4/00 |
| EP | 0 639 628 B1 | 2/1995 | C09D/175/12 |
| EP | 0 650 988 B1 | 5/1995 | C08G/18/10 |
| EP | 0 667 362 A1 | 8/1995 | C08G/18/38 |
| EP | 0 743 333 A1 | 11/1996 | C08G/18/38 |
| EP | 0 751 191 A2 | 1/1997 | C09D/5/02 |
| EP | 0 807 648 | 11/1997 | C08G/18/08 |
| EP | 0 751 191 A3 | 12/1997 | C09D/5/02 |
| EP | 0 810 203 A1 | 12/1997 | C07C/237/04 |
| JP | 58-65772 | 4/1982 | C09D/5/00 |

(List continued on next page.)

OTHER PUBLICATIONS

Zwiener et al., "Aspartic acid esters. A new line of reactive diluents for high–solids two–pack polyurethane coatings," STN International, File CAPLUS, CAPLUS Accession NO. 1991: 561251, Document No. 115: 161251, FATIPEC–Kongr., 20$^{th}$, pp. 267–70, (1990).

Primary Examiner—Patricia A. Short
(74) Attorney, Agent, or Firm—Lucy C. Weiss

(57) ABSTRACT

A pavement marking composition comprises (a) a polyfunctional ethylenically unsaturated polymer selected from the group consisting of polyfunctional ethylenically unsaturated polyurethanes, polyureas, polythiocarbamates, polythiocarbamateurethanes, polythiocarbamateureas, and polyurethaneureas comprising at least one chain extender-derived segment and at least one polycarbonate, polyether, or polyester segment; and (b) at least one ethylenically unsaturated monomer. The composition can be easily applied, cures in a reasonable amount of time at any of a wide range of commonly-encountered temperatures, and provides pavement markings that exhibit both improved cold impact resistance and improved wear resistance.

22 Claims, No Drawings

FOREIGN PATENT DOCUMENTS

| | | | |
|---|---|---|---|
| JP | 8-48744 | 2/1996 | ............ C08G/18/67 |
| JP | 8-259643 | 10/1996 | ......... C08F/290/06 |
| JP | 10-102406 | 4/1998 | ........... C08L/21/00 |
| WO | WO 96/15179 | 5/1996 | |
| WO | WO 96/33241 | 10/1996 | ............ C09D/4/06 |
| WO | WO 97/03814 | 2/1997 | ........... B29D/11/00 |
| WO | WO 97/28470 | 8/1997 | ........... G02B/5/128 |
| WO | WO 97/49746 | 12/1997 | ........... C08G/18/32 |
| WO | WO 98/56842 | 12/1998 | ........... C08G/18/32 |

PAVEMENT MARKING COMPOSITION

FIELD OF THE INVENTION

This invention relates to compositions comprising polymeric binder and optional reflective elements for use in marking trafficable surfaces.

BACKGROUND OF THE INVENTION

Various striping or marking compositions have been used on roads, highways, parking lots, and recreational trails for many years. Such compositions are typically used to form stripes, bars, and other markings for the delineation of lanes, crosswalks, parking spaces, symbols, legends, and the like. The compositions are often applied by spray coating (i.e., painting) a pavement surface.

Conventional liquid pavement marking compositions include alkyd-based compositions and epoxy-based compositions. Such compositions typically dry slowly and contain chemical linkages (e.g., ester linkages) that are susceptible to degradation (e.g., by hydrolysis), leading to poor weatherability upon application to pavement surfaces. The compositions also typically require the use of organic solvents or drying oils (in order to obtain sprayable viscosities) or the use of drying accelerators, which can lead to discoloration.

In addition to alkyd- and epoxy-based compositions, isocyanates plus polyethers or polyamines have been utilized as two-part compositions to provide polyurethane- or polyurea-based pavement markings. Such compositions have provided improvements in drying times, weatherability, and resistance to discoloration (relative to alkyd- and epoxy-based compositions), but require the handling of moisture sensitive, potentially hazardous isocyanates.

Numerous other pavement marking compositions have been developed to get faster drying times by using heated application of materials to road surfaces. Also, waterborne coatings based on acrylic lattices and epoxy resin emulsions have been suggested for use in pavement marking. Such compositions have the advantages of low volatile organic content and one-part coating application but are not yet sufficiently durable for long term road presence and retained reflectivity performance. The former also require the use of expensive heating equipment.

Acrylate-based coating compositions have provided a balance of stability and fast cure (even at low temperatures) but have required the use of low molecular weight, ethylenically unsaturated compounds that have significant vapor pressures and are thus somewhat difficult to handle at higher ambient temperatures. Preformed pavement marking sheets or tapes have been used for their ease of handling but often exhibit adhesion problems, especially at road intersections.

Thus, there exists a continuing need in the art for pavement marking compositions that can be easily and safely handled and applied without the need for expensive equipment, that can be quickly cured even at ambient temperatures, and that are durable under a wide range of weather and use conditions.

SUMMARY OF THE INVENTION

Briefly, in one aspect, this invention provides a pavement marking composition comprising (a) a polyfunctional ethylenically unsaturated polymer selected from the group consisting of polyfunctional ethylenically unsaturated polyurethanes, polyureas, polythiocarbamates, polythiocarbamateurethanes, polythiocarbamateureas, and polyurethaneureas comprising at least one chain extender-derived segment and at least one polycarbonate, polyether, or polyester segment; and (b) at least one ethylenically unsaturated monomer. (As used herein, the term "chain extender" refers to a polyfunctional, molecular weight increasing co-reactant.) Preferably, the polyfunctional polymer comprises at least one polycarbonate or polyester segment, and the ethylenically unsaturated monomer is a (meth)acryloyl-functional monomer having a molecular weight greater than about 150. Most preferably, the composition further comprises a curing system, filler, pigment, and/or reflective elements.

Relative to known liquid pavement marking compositions, the pavement marking composition of the invention provides durably bondable pavement markings that surprisingly exhibit both improved cold impact (snow plow) resistance and improved wear resistance, even though these characteristics are generally difficult to simultaneously achieve and/or enhance. The composition can be easily applied (e.g., by hand using a trowel or a drawbox or by spraying), without the need for expensive and/or bulky heating equipment, and cures in a reasonable amount of time at any of a wide range of commonly-encountered temperatures. Furthermore, since the composition does not contain either solvent or reactive isocyanate (nor, in preferred embodiments, low molecular weight monomer), it can be safely handled with reduced inhalation risk and environmental hazard.

In other aspects, this invention also provides a pavement marking comprising the cured pavement marking composition of the invention, a trafficable surface bearing the pavement marking, and a process for marking or for applying a pavement marking.

DETAILED DESCRIPTION OF THE INVENTION

Polyfunctional ethylenically unsaturated polymers suitable for use in the composition of the invention are those polyfunctional ethylenically unsaturated polyurethanes, polyureas, polythiocarbamates, polythiocarbamateurethanes, polythiocarbamateureas, and polyurethaneureas that comprise at least one chain extender-derived segment and at least one polycarbonate, polyether, or polyester segment. The polymers can be prepared by the reaction of at least one polyisocyanate; at least one hydroxyl-, thio-, or secondary amino-polyfunctional polycarbonate, polyether, or polyester; at least one isocyanate-reactive polyfunctional chain extender; and at least one ethylenically unsaturated monomer having additional functionality, e.g., hydroxyl or amine, that is reactive with isocyanate.

Useful polyisocyanates include aliphatic, alicyclic, and aromatic diisocyanates, and mixtures thereof. A number of such diisocyanates are commercially available. Representative examples of suitable diisocyanates include hexamethylene diisocyanate (HDI), trimethyl hexamethylene diisocyanate (TMHDI), m- and p-tetramethylxylene diisocyanate (TMXDI), diphenylmethane diisocyanate (MDI), napthalene diisocyanate (NDI), phenylene diisocyanate, isophorone diisocyanate (IPDI), toluene diisocyanate (TDI), bis(4-isocyanatocyclohexyl)methane ($H_{12}MDI$), and the like, and mixtures thereof. Useful polyisocyanates also include derivatives of the above-listed monomeric polyisocyanates. These derivatives include, but are not limited to, polyisocyanates containing biuret groups, such as the biuret adduct of hexamethylene diisocyanate (HDI) available from Bayer Corp., Pittsburgh, Pa. under the trade designation Desmodur™ N-100, polyisocyanates containing isocyanurate groups, such as that available from Bayer Corp., Pittsburgh, Pa. under the trade designation Desmodur™ N-3300, as well as polyisocyanates containing urethane groups, uretdione groups, carbodiimide groups, allophonate groups, and the like. If desired, small amounts of one or more polyisocyanates having three or more isocyanate groups can be added to effect a degree of crosslinking. Preferred polyisocyanates include aliphatic diisocyanates and derivatives thereof, with IPDI being most preferred.

Useful polycarbonates, polyethers, and polyesters include those which have an equivalent weight in the range of about 250 to about 5000 (preferably from about 400 to about 2,500, more preferably from about 500 to about 1,500) and which have an average secondary amino-, thio-, and/or hydroxyl-functionality of about 2.0 to about 3.0 (preferably of about 2.0 to about 2.8, more preferably of about 2.0 to about 2.5). A number of such functional polymers are commercially available. Diols are preferred due to their availability, low cost, and stability. Representative examples of polymers that are useful (when functionalized in the foregoing manner) include aliphatic polycarbonates such as polyestercarbonates and polyethercarbonates; polyethers such as polyethylene glycol, polypropylene glycol, polybutylene glycol, and polytetrahydrofuran; polyesters such as polycaprolactones, polybutylene adipate, polydiethylene adipate, poly(3-methyl-1,5-pentane)adipate, and poly(neopentyl/1,6-hexane)adipate; and mixtures thereof. Polycarbonates and polyesters are preferred because of their excellent UV-, heat-, and oxidation stability, with polycarbonates being most preferred because of their excellent hydrolysis resistance.

Useful chain extenders include low molecular weight (e.g., below about 1000, preferably below about 600) polyols, e.g., ethylene glycol, 1,2- and 1,3-propanediol, 1,3- and 1,4- and 2,3-butanediol, diethylene glycol, dipropylene glycol, tripropylene glycol, 1,6-hexanediol, 1,4-cyclohexane dimethanol, 3-methyl 1,5-pentanediol, and neopentyl glycol; low molecular weight secondary polyamines, e.g., 1,3-di(4-piperidyl)propane (DIPIP), N(2-aminoethyl propylmethyldimethoxysilane (DAS), piperazine, N,N'-dialkyl (methylene)dianiline, N,N'-dialkyl(1,4-diamino)benzene, N,N'-bis(diisopropylmethyl)diaminoethane, and N,N'-bis(t-butyl)diamino cyclohexane; and the like; and mixtures thereof. Although difunctional chain extenders are generally preferred, small amounts of one or more chain extenders having three or more isocyanate-reactive functional groups can be added, if desired.

Preferred chain extenders are the secondary amine reaction products of maleic acid esters and polyamines, i.e., aspartic ester polyamines. Such chain extenders are preferred, e.g., for the polymer properties that they provide. Preferred aspartic ester polyamines have the following formula

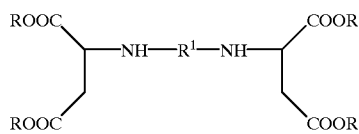

wherein $R^1$ is a divalent organic group (preferably having from 1 to about 40 carbon atoms) and each R is independently an organic group inert toward isocyanate groups at temperatures of 100° C. or less.

In the above formula, preferably $R^1$ is an aliphatic group (preferably having from 1 to about 40 carbon atoms), which can be branched, unbranched, or cyclic, and more preferably, $R^1$ is selected from the group of divalent hydrocarbon groups obtained by the removal of the amine groups from 1,4-diaminobutane, 1,6-diaminohexane, 2,2,4- and 2,4,4-trimethyl-1,6-diaminohexane, 1-amino-3,3,5-trimethyl-5-aminomethyl-cyclohexane, 4,4'-diamino-dicyclohexyl methane, or 3,3-dimethyl-4,4'-diamino-dicyclohexyl methane. Divalent hydrocarbon groups obtained by the removal of the amine groups from relatively high molecular weight polyether polyamines containing aliphatically-bound primary amine groups, such as the products marketed under the trade designations Jeffamine™ (by Texaco and Huntsman) and Hycar™ (by B.F. Goodrich), are also suitable. Other suitable polyamine precursors include ethylene diamine, 1,2-diaminopropane, 1,6-diaminohexane, 2,5-diamino-2,5-dimethylhexane, 1,11-diaminoundecane, 1,12-diaminododecane, 2,4- and/or 2,6-hexahydrotoluylene diamine, and 2,4'-diamino-dicyclohexyl methane. Aromatic polyamines such as 2,4- and/or 2,6 -diaminotoluene and 2,4'- and/or 4,4'-diaminodiphenyl methane are also suitable but less preferred, due to their lower reactivity and tendency to yellow.

In the above formula, preferably, each R is independently an organic group having from 1 to about 40 carbon atoms, more preferably each R is independently an alkyl group (preferably having from 1 to about 20 carbons), which may be branched or unbranched, and most preferably each R is independently a lower alkyl group (having from 1 to about 4 carbon atoms).

Suitable aspartic ester polyamines are commercially available from Bayer (Pittsburgh, Pa., U.S.A. or Leverkusen, Germany) under the trade designations Desmophen™ XP-7053, XP-7059, VP-LS 2973, and XP-7109, for example. Desmophen™ XP-7053 is substantially composed of the following compound, N,N'-(4,4'-dicyclohexylmethane-diyl)bis tetraethyl aspartic ester:

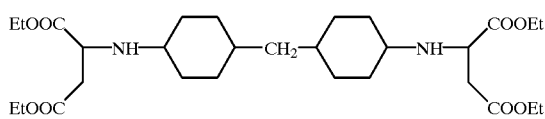

Desmophen™ XP-7059 is substantially composed of the following compound, N,N'-(hexane-1,6-diyl)bis tetraethyl aspartic ester:

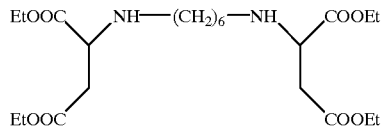

Desmophen™ XP-7109 is substantially composed of the following compound, N,N'-(2-methylpentane-1,5-diyl) tetrabutyl aspartic ester:

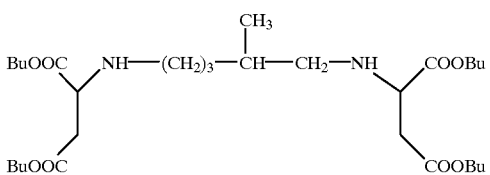

Desmophen™ VP-LS 2973 (preferred) is substantially composed of the following compound, N,N'-(3,3-dimethyldicyclohexylmethane-4,4'-diyl)-bis-tetraethyl aspartic ester:

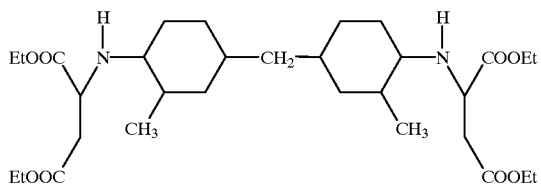

Other suitable aspartic ester polyamines include, e.g., N,N'-(bis-2-propyl)polypropyleneglycol 300-O,O'-diyl-bis-tetraethyl aspartic ester, N,N'-(butyl-1,4-diyl)-bis-tetraethyl aspartic ester, N,N'-(2,2-dimethylpropane-1,3-diyl)-bis-tetraethyl aspartic ester, N,N'-(2,4-dimethylhexane-1,6-diyl)-bis-tetraethyl aspartic ester, and the like, and mixtures thereof.

Suitable ethylenically unsaturated monomers for use in preparing the polyfunctional polymer are those which further comprise isocyanate-reactive functionality, e.g., hydroxyl or amine functionality. Representative examples of suitable monomers include 2-hydroxyethyl methacrylate, 3-hydroxypropyl methacrylate, 2-hydroxyethyl acrylate, 3-hydroxypropyl acrylate, 4-hydroxybutyl acrylate, 4-hydroxybutyl methacrylate, allyl alcohol, allylethyl alcohol, oleyl alcohol, 4-vinylbenzyl alcohol, and the like, and mixtures thereof. Preferred ethylenically unsaturated monomers are (meth)acryloyl functional. Most preferred is 2-hydroxyethyl methacrylate.

The polyfunctional polymer can be prepared by first combining at least one hydroxyl-, thio-, or secondary amino-polyfunctional polycarbonate, polyether, or polyester (about 0.1 to about 2.5 moles) with at least one isocyanate (about 2.0 to about 3.0 moles), optionally in the presence of a solvent. If desired, the ethylenically unsaturated monomer described infra can be present at this stage to function as a solvent. The resulting mixture can be allowed to react for about 1 hour at about 40–60° C. under a dry, inert gas atmosphere, generally with stirring. About 0.01% of an organometallic catalyst, e.g., of tin or bismuth, can be utilized, as further explained below. Chain extender(s) (about 0.1 to about 1.5 moles) can then be added to the mixture. However, the chain extender can be part of the initial mixture (of polymer and isocyanate) described above, if desired. The reaction can be allowed to continue for a period of about 3 hours until the isocyanate content is near the theoretical value. Finally, the isocyanate-reactive, ethylenically unsaturated monomer(s) can be added (about 0.2 to about 5.6 moles) and reaction continued for a period of about 2 hours to provide polyfunctional polymer.

Preferably, a catalyst is used in preparing the polyfunctional polymer. Catalysts for reacting isocyanates and active hydrogen-containing compounds are well known in the art. Preferred catalysts include organometallic compounds and amines. Useful organometallic compounds include organo-tin compounds such as dimethyltin dilaurate, dibutyltin dilaurate, dibutyltin dimercaptide, bis lauryl(dibutyltin) oxide, and the like, and mixtures thereof. Zinc or bismuth compounds are also useful. Amine catalysts include tertiary amines, such as, for example, diazobicyclooctane. A preferred catalyst is dibutyltin dilaurate. Catalyst is used in an amount effective to provide a desired reaction rate. Preferably, catalyst is used in an amount of about 0.01–2 percent by weight (more preferably, 0.01–0.03 percent by weight), based on the total weight of solids.

Water can accelerate the reaction of aspartic ester amines with isocyanates. Free water may be present in the system or adsorbed on the polyfunctional polycarbonate, polyether, or polyester reactant or on any added pigments or fillers.

The polyfunctional polymer can be used to prepare the pavement marking composition of the invention by combining the polymer with reactive diluent, i.e., with at least one ethylenically unsaturated monomer. Suitable monomers are those which are capable of reacting with the polyfunctional polymer. Preferred monomers are (meth)acryloyl-functional monomers, more preferably (meth)acryloyl-functional monomers having a molecular weight of at least about 150 and/or a vapor pressure of less than about 43 mbar at 20° C. (most preferably less than about 10 mbar at 20° C.)

Representative examples of suitable monomers include methyl acrylate, ethyl acrylate, n-butyl acrylate, isobutyl acrylate, t-butyl acrylate, ethyl methacrylate, butyl methacrylate, ethyltriglycol methacrylate, isobornyl acrylate, 2-(((butylamino)carbonyl)oxy)ethyl acrylate, acetoacetoxyethyl methacrylate, acetoacetoxyethyl acrylate, acetoacetoxypropyl acrylate, acetoacetoxybutyl acrylate, 2-methyl-2-(3-oxo-butyrylamino)-propyl methacrylate, 2-ethylhexyl acrylate, n-octyl acrylic acetate, decyl acrylate, lauryl acrylate, stearyl acrylate, 2-hydroxyethyl acrylate, 2-hydroxypropyl acrylate, 2-hydroxyethyl methacrylate, 2-hydroxypropyl methacrylate, β-ethoxyethyl acrylate, 2-cyanoethyl acrylate, cyclohexyl acrylate, diethyl amino-ethyl acrylate, hexyl methacrylate, decyl methacrylate, lauryl methacrylate, stearyl methacrylate, phenylcarbitol acrylate, nonylphenyl carbitol acrylate, nonylphenoxy propyl acrylate, N-vinyl pyrrolidone, polycaprolactam acrylate, acryloyloxyethyl phthalate, acryloyloxy succinate, 2-ethylhexyl carbitol acrylate, ω-carboxy-polycaprolactam monoacrylate, phthalic acid monohydroxyethyl acrylate, styrene, vinyl acetate, vinyl toluene, α-methyl styrene, acrylonitrile, gycidyl methacrylate, n-methylol acrylamide-butyl ether, n-methylol acrylamide, acrylamide, dicyclopentenyloxyethyl acrylate, dicyclopentenyl acrylate, dicyclopentenyloxyethyl acrylate, and the like, and mixtures thereof.

Preferred monomers include ethyl acrylate, n-butyl acrylate, isobutyl acrylate, t-butyl acrylate, methyl methacrylate, ethyl methacrylate, butyl methacrylate, ethyltriglycol methacrylate, isobornyl acrylate, 2-(((butylamino)carbonyl)oxy)ethyl acrylate, acetoacetoxyethyl methacrylate, acetoacetoxyethyl acrylate, acetoacetoxypropyl acrylate, acetoacetoxybutyl acrylate, 2-methyl-2-(3-oxo-butyrylamino)-propyl methacrylate, 2-ethylhexyl acrylate, and mixtures thereof, with isobornyl acrylate, 2-(((butylamino)carbonyl)oxy)ethyl acrylate, ethyltriglycol methacrylate, 2-ethylhexyl acrylate, 2-ethylhexyl methacrylate, acetoacetoxyethyl methacrylate, acetoacetoxyethyl acrylate, acetoacetoxypropyl acrylate, acetoacetoxybutyl acrylate, 2-methyl-2-(3-oxo-butyrylamino)-propyl methacrylate, and mixtures thereof being more preferred.

If desired, small amounts of multifunctional ethylenically unsaturated monomer(s) (compounds possessing at least two polymerizable double bonds in one molecule, e.g., multifunctional acrylates or methacrylates) can be utilized to, e.g., effect crosslinking. Representative examples of such multifunctional monomers include ethylene glycol diacrylate; 1,2-propylene glycol diacrylate; 1,3-butylene glycol diacrylate; 1,6-hexanediol diacrylate; noepentylglycol diacrylate; trimethylolpropane triacrylate; polyoxyalkylene glycol diacrylates such as dipropylene glycol diacrylate, triethylene glycol diacrylates, tetraethylene glycol diacrylates, polyethylene glycol diacrylate; ethylene glycol dimethacrylate; 1,2-propylene glycol dimethacrylate; 1,3-butylene glycol dimethacrylate; 1,6-hexanediol dimethacrylate; neopentylglycol dimethacrylate; bisphenol-A-dimethacrylate; diurethane dimethacrylate; trimethylolpropane trimethacrylate; polyoxyalkylene glycol dimethacrylates such as dipropylene glycol dimethacrylate, triethylene glycol dimethacrylates, tetraethylene glycol dimethacrylates, polyethylene glycol dimethacrylate; N,N-methylene-bis-methacrylamide; diallyl phthalate; triallyl phthalate; triallyl cyanurate; triallyl isocyanurate; allyl acrylate; allyl methacrylate; diallyl fumarate; diallyl isophthalate; diallyl tetrabromophthalate, and the like, and mixtures thereof.

In preparing the pavement marking composition of the invention, the polyfunctional polymer can be combined with at least one ethylenically unsaturated monomer in a ratio of about 1:10 to about 10:1 (preferably about 3:10 to about 1:1, more preferably about 2:3) and the resulting mixture allowed to react for a period of about 15 to about 30 minutes. Although the composition can be cured by exposure to ultraviolet (if the composition is only lightly filled) or electron beam radiation, thermal curing is generally preferred. If radiation curing is utilized, one or more photoinitiators, e.g., benzophenone can be added, if necessary or desired, e.g., in amounts ranging from about 0.05 to about 5 weight percent. Representative examples of suitable photoinitiators include 2,2-dimethoxy-1,2-diphenylethane-1-one, 1-hydroxy-cyclohexyl-phenylketone, 2-methyl-1-[4-(methylthio)phenyl]-2-morpholinopropanone-1,1-hydroxy-cyclohexyl-phenylketone, benzophenone, and the like, and mixtures thereof.

Preferably, however, a curing system comprising a thermal polymerization initiator and, preferably, an accelerator is utilized (e.g., in amounts of from about 0.01 to about 5 weight percent of each). Useful thermal polymerization initiators include organic peroxides, e.g., diacyl peroxides, dialkyl peroxides, hydroperoxides, ketone peroxides, and the like, and mixtures thereof. The accelerator of the curing system, if an accelerator is used, functions to decompose the initiator through a redox reaction and thereby facilitates the generation of active radicals. (Alternatively, heat and pressure can be utilized to accelerate reaction.) Useful accelerators include metal salts, e.g., cobalt naphthenate and vanadium octoate; tertiary amines; mercaptanes, e.g., dimethyl-p-toluidine, diisopropoxy-p-toluidine, diethyl-p-toluidine, dimethyl aniline, and glycol dimercaptoacetate; and the like; and mixtures thereof. The accelerator can be included in the initial pavement marking composition, with the initiator preferably being added just prior to application of the composition to a trafficable surface.

The pavement marking composition of the invention can further comprise other optional components, if desirable for a particular application or use. For example, weathering additives such as ultraviolet absorbers, hindered amine light stabilizers, antioxidants, dispersing and grinding aids, wetting agents, adhesion promoters, impact modifiers (e.g., rubber tougheners such as those available under the trade designations Paraloid™ 2691 and EXL-2330 from Rohm and Haas), defoamers, suspension stabilizers, biocides, etc., can be added to improve the manufacturability and the overall durability of markings of the present invention.

Also, pigments (e.g., $TiO_2$), fillers (e.g., talc, $CaCO_3$, clay, and hollow glass microspheres), extenders, diluents, plasticizers, leveling agents, and surfactants can be used. Pigments are well known in the pavement marking art to impart desired visual appearance properties in the daytime and contribute to reflective performance of the marking at night. Fillers and extenders can be used to modify flow properties of the liquid coating and contribute to the bulk volume of the final coating with lower cost per volume materials. The pigments, fillers, and extenders can have a significant impact on uncured formulation and cured film density, film cure profile and track free time, cured film modulus, coating adhesion to a substrate, response to thermal cycling, possible shrinkage of polymer components, abrasion, and coating durability. Typically at least about 15 weight percent of the final dried coating is made up of such non-soluble material, more preferably, at least about 20 weight percent and, most preferably, at least about 50 weight percent. In some instances, about 30 weight percent to about 80 weight percent of pigments, fillers, and extenders can be used.

Preferably, the pavement marking composition of the invention includes drying wax to prevent oxygen inhibition of the radical curing. (Alternatively, an inert gas atmosphere can be provided.) Suitable waxes include paraffin waxes, polyethylene waxes, stearic acids, and the like, and mixtures thereof. Paraffin waxes are generally preferred. Drying wax can generally be used in an amount of about 0.2 to about 5 (preferably about 0.3 to about 2.5) parts per 100 parts of the composition.

The pavement marking composition of the invention can be applied directly to a trafficable surface with or without a primer layer or to a substrate that is applied to the surface. This can be easily done by hand using simple equipment, e.g., a trowel or a drawbox, or by spray coating techniques. Typically, a polyfunctional polymer/ethylenically unsaturated monomer/accelerator component and an initiator component can be applied using a spraying apparatus (e.g., equipment available from Hofmann as Model Numbers H 26-2 Universal and H 33-2 Universal) that allows the components to combine (e.g., in a ratio of about 98 parts of the polymer/monomer/accelerator mixture to about 2 parts initiator) and mix (either statically or dynamically) immediately prior to exiting the apparatus. Alternatively, a component comprising polymer, monomer, and accelerator can be combined immediately prior to exiting the apparatus with (i) a component comprising polymer, monomer, and initiator; or (ii) with both a component comprising polymer and monomer and a component comprising initiator. Other possible combinations will be recognized by those skilled in the art.

Although not necessary, more complex application equipment can be utilized, if desired. For example, two-component, high pressure, airless, impingement mixing systems can be used. Also, plural component spray equipment with a static mixer can be used. An example of an airless, impingement mixing spray system is manufactured by Gusmer (1 Gusmer Drive, Lakewood, N.J. 08701-0110). The system includes the following components: a proportioning section which meters the two components and increases the pressure to above about 1500 psi (103 bar); a heating section to raise the temperatures of the two components (preferably, independently) to control viscosity; and an impingement spray gun which combines the two components and allows mixing just prior to atomization. Other manufacturers of impingement systems include Binks Manufacturing (Chicago, Ill.) and Probler.

Another more complex system that can be used for applying the composition of the invention is a system which uses a static mix tube to achieve blending of the polymer/monomer and initiator components. The system is similar to that of the impingement unit in that it meters, builds pressure, and heats the components. However, at the spray gun, the components are combined and pumped through a length of tubing which contains flights designed to mix the components prior to atomizing. This system requires periodic flushing of the static mix tube to prevent accumulation of cured composition which could plug the spray gun. An example of such a spray gun is a Binks Model 43P.

The pavement marking composition of the invention cures rapidly at a wide range of application temperatures, e.g., at temperatures as low as about 0° C. and as high as about 40° C., to provide markings that exhibit excellent wear and impact resistance characteristics. The markings have conventional daytime visibility, but, if desired, reflective optical elements can be added to the pavement marking composition to enhance night time visibility. Generally, the reflective elements are no greater than about several millimeters in average diameter. When the reflective elements are ceramic, e.g., glass, microspheres, they are typically in the range of about 200 micrometers to about 600 micrometers in average diameter.

The reflective elements can be in the form of glass beads (also referred to as microspheres or microsphere lenses) that are preferably light transmissible. Chemical treatment of bead surfaces, such as with an organochromium compound, may be utilized as known in the art to enhance resin to glass adhesion. Other chemical coupling agents such as silanes, titanates, and zirconates are also known. Additionally, fluorocarbon treatment of the glass beads can aid in achieving substantially uniform hemispherical bead sinkage.

Ceramic, e.g., glass, beads or microspheres can also be used as a filler, in addition to providing night time reflectivity. The beads or microspheres may function similarly to mineral particulates on the wear surface of a coated abrasive (sandpaper), protecting the polymeric binder from applied stresses. The microsphere average diameter, application or coverage rate (weight per unit area), and surface chemistry (e.g., treatment with coupling agent) affect the durability of pavement markings. Preferably, coverage rates are greater than about 6 grams of beads per 4 inch lineal foot (10×30 cm area), for a 15 mil (0.4 mm) thick cured film, more preferably greater than about 15 grams, even more preferably, greater than about 38 grams and, most preferably, greater than about 45 grams of beads per 300 cm² area for a 0.4 mm thick cured film.

The ceramic beads can be applied directly to the composition coated on a pavement surface. Alternatively, retroreflective optical elements having vertical surfaces can be utilized. Vertical surfaces provide better orientation for retroreflection. Also, vertical surfaces may prevent the build-up of a layer of water over the retroreflective surface during rainy weather, which otherwise interferes with the retroreflection mechanism.

One type of such retroreflective optical elements with vertical surfaces is made up of pellets comprising a thermoplastic core coated with ceramic beads. Such reflective elements are made by the introduction of pellets of a thermoplastic polymer to a heated bed of ceramic beads, either a fluidized bed or a rotary kiln. The temperatures and residence times are such that the beads adhere to the surface polymer pellets, become partially embedded in the surface, and prevent the pellets from agglomerating with one another. Polymers that can be used as the cores of thermoplastic reflective elements include ethylene methacrylic acid (EMAA) and ethylene acrylic acid (EAA) copolymers, polycarbonate, and thermoplastic polyurethanes. Such reflective elements provide controlled delivery of the beads. The elements and methods of making them are described in U.S. Pat. No. 5,750,191 (Hachey et al.), the descriptions of which are incorporated herein by reference.

Layered elements have been made using polymers having differing melt behavior. The retroreflective elements include a plurality of optical elements, e.g., ceramic beads, partially embedded in the vertical surfaces of the central layer of the reflective element's core. The core has a central layer having a first and a second major surface and at least one vertical surface. On the first and the second major surfaces, a barrier layer is applied. The central and barrier layers' compositions are selected such that a plurality of optical elements, when heated to the embedment temperature, embed and adhere to the central layer while the barrier layers are substantially free from optical elements.

One method of forming these retroreflective elements is by extruding a central layer between the barrier layers and calendering to the desired thickness. Suitable central layer material includes polymeric materials, both thermoplastic and thermoset, and mixtures thereof. This composite is then processed into cores of desired shape and size. The cores are then combined with the optical elements such that the optical elements embed and adhere in the vertical surface(s) of the central layer at the embedment temperature. Sandwich constructions can be made by laminating a lower melting material between two layers of higher melting polymer or coating a crosslinkable coating on the upper and lower surfaces of a sheet of lower melting polymer. The composite sheet can be cut into the desired shape and the shaped particles coated with optical elements such as beads or microspheres in a way similar to the thermoplastic elements to yield elements with beads selectively placed only on the sides (vertical surfaces) of the structure. Materials suitable for this class of elements include polyester polyols for the lower melting core and polyethylene terephthalate (PET) and two component polyurethanes for the outer layers. Such reflective elements and methods of making them are described in International Patent Publication No. WO 97/28470 (Minnesota Mining and Manufacturing Co.), the descriptions of which are incorporated herein by reference.

All-ceramic retroreflective elements can be made, which can be used in pavement markings, with greatly improved resistance to wear and the effects of weathering. These retroreflective elements are free of metals and polymeric material and are comprised of an opacified ceramic core and ceramic optical elements partially embedded into the core. The opacified ceramic cores of these composite reflective optical elements will often contain a mixture of amorphous (glass) and crystalline phases. The retroreflective element may be irregular in shape or in the form of a sphere, disc, tile, etc. The diffuse reflecting ceramic core, in combination with the transparent optical elements embedded in the surface, provides a surprisingly bright retroreflective element without the grey coloration and the susceptibility to corrosion associated with metallic specular reflectors. Moreover, such composite elements are inexpensive to manufacture and install. Such reflective elements and methods of making them are described in U.S. Pat. No. 5,774,265 (Mathers et al.), the descriptions of which are incorporated herein by reference.

Many other variations of composite retroreflective elements or aggregates are known which have a polymeric core with optical elements embedded in the core surface. See, for example, U.S. Pat. Nos. 3,252,376, 3,254,563, 4,983,458, 4,072,403, 4,652,172, and 5,268,789. Other retroreflective elements can also be constructed having a ceramic core and glass optical elements with a metallic specular coating. See, for example, U.S. Pat. Nos. 3,043,196, 3,175,935, 3,556,637, 3,274,888, and 3,486,952, and EP Publication No. 0,322,671. Retroreflective elements made from ceramics other than glass typically exhibit greater resistance to weathering and to wear. Some known embodiments also contain optical elements dispersed throughout the core. The core may be irregular in shape or may be regularly shaped e.g., spheres, tetrahedrons, discs, square tiles, etc.

Whatever the type of reflective element, the elements can be flood coated (along with anti-skid particles, if desired) onto the entire surface of the composition painted on a pavement surface. However, this can be quite expensive for ceramic beads or microspheres. Alternatively, the reflective elements can be positioned only in the most efficient optical part of the surface. Control of element placement on liquid markings is important for obtaining durable high retroreflectivity. The elements can also be included within one of the components of the pavement marking composition prior to mixing and can be applied, for example, during the spray coating of the composition.

Also, it is important to understand the mechanism of embedment of elements, whether in the form of coated pellets or beads. Surface treatments can be used to obtain appropriate sink (not too deep and not too shallow) and to control wetting and capillation of the coating up the sides of the element. Also, the cure rheology of the composition can affect the ability to sink elements.

Objects and advantages of this invention are further illustrated by the following examples, but the particular materials and amounts thereof recited in these examples, as well as other conditions and details, should not be construed to unduly limit this invention.

EXAMPLES

In the following Examples, all parts are by weight unless otherwise specified.
Test Methods for Examples 1–9 and Comparative Examples 1–3
Abrasion Sample preparation: The freshly prepared pavement marking compositions (containing thermal polymerization intitiator) described in the Examples below were cast between two siliconized polyester liners at a thickness of 200 microns using a knife coater. Each composition was then allowed to cure between the two liners at 23° C. for 24 hours. A 10 cm×10 cm square sample was then cut from each resulting cured sheet.

Test: Abrasion resistance was measured according to DIN (Deutsches Institut für Normung) Method 53754. The abrasion wheel H22 was employed at a rate of 70 revolutions per minute for 500 revolutions (10 minutes). The sample was weighed before and after the abrasion. Before weighing, the abraded surface was cleaned with a soft brush to remove loose abraded material. This test procedure was repeated 4 times, and the results were averaged and normalized to 2000 revolutions. The results are reported in grams of material lost per 2000 revolutions.
Adhesion to Concrete Sample preparation: 30 g samples of the freshly prepared pavement marking compositions described in the Examples below were cast onto a concrete slab (sidewalk slabs according to DIN 485 available from Hagebau Markt, Neuss, Germany), the upper surface of which had been cleaned with a wire brush. Coatings were prepared using shims and a smoothing bar at a thickness of 2 mm. The area of the concrete slab covered by coated sample was 15 cm×6 cm. The coated sample was allowed to cure for 24 hours at 23° C.

Test: Adhesion of the cured sample to the concrete was measured according to DIN-ISO (Deutsches Institut für Normung—International Organization for Standardization) Method 4624. A circle of 20 mm in diameter was cut through the cured sample and into the underlying concrete surface. The lower flat surface of a steel cylinder of 50 mm diameter was adhered to the cured sample within the cut circle using a two-component epoxy adhesive (available as Araldit Rapid™ from Ciba-Geigy). After allowing at least 8 hours curing time for the bonding of the cylinder to the cured sample, a spring-scale force measuring device (available from Ericksen, Hemer, as Adhesion Tester Model 525) was used to attempt to remove the steel cylinder from the concrete block. The maximum force required to break the bond between the cured sample and the underlying concrete surface was recorded in $N/mm^2$.
Cold Impact Resistance Sample preparation: 30 g samples of the freshly prepared pavement marking compositions (containing thermal initiator) described in the Examples were cast onto a concrete slab (a sidewalk slab according to DIN 485 available from Hagebau Markt, Neuss, Germany), the upper surface of which had been cleaned with a wire brush. Coatings were prepared using shims and a smoothing bar at a thickness of 2 mm. The area of the concrete slab covered by coated sample was 15 cm×6 cm. The samples were allowed to cure for 24 hours at 23° C.

Test: Cold impact resistance was measured using a modified version of ASTM (American Society for Testing and Materials) Method D-1709/75. The concrete slab bearing the cured sample was placed in a freezer at a temperature of −20° C. for 12 hours. The slab was then removed from the freezer and placed under the impact bolt of a device used to measured impact resistance. The device differed from that described in the above-cited ASTM method in that the sample-supporting block (allowing for displacement of metal sheets upon impact, for example) had been removed. The concrete slab bearing the cured sample was placed directly under the impact bolt of the device. Impact energies (representing 2, 4, 8, 16, and 21 Joules, respectively) were delivered to different areas of the cured sample. The highest impact energy that caused no damage to the sample surface was recorded in Joules.
Preparation of Polymer/Monomer Mixtures (Table 1)
Mixture 1

A methacryloyl-polyfunctional polyurethane was prepared by placing 1.7 moles (378 g) isophorone diisocyanate (IPDI) (NCO equivalent weight of 111) in a 5 liter, four-necked flask equipped with a thermometer, a mechanical stirrer, an inert gas inlet, and a reflux condenser. A polycarbonate diol (0.34 moles, 723 g, OH equivalent weight of 1063, available as Desmophen™ C 200 from Bayer, Leverkusen, Germany) was added to the flask in three portions, so as not to exceed a reaction temperature of 60° C. Butanediol (31 g, 0.34 moles) was then added in two portions, and the resulting mixture was held at 50° C. After two hours, the remaining isocyanate concentration was measured by titration according to DIN 53 185. A calculated equimolar amount (with 10% excess) of 2-hydroxyethylmethacrylate (HEMA) (corresponding to 1.1 moles or 150 g) was then added in three portions. The resulting mixture was then maintained at 50° C. for 8 hours and then allowed to cool to 23° C.

Forty parts by weight of the resulting methacryloyl-polyfunctional polyurethane were then mixed with 60 parts by weight of a monomer mixture consisting of methyl methacrylate (MMA) and 2-ethylhexyacrylate (2-EHA) in a 4:1 mole ratio (a weight ratio of 2:1). The viscosity of the resulting polymer/monomer mixture was 40–60 mPa.s.

Mixture 2

The procedure for the preparation of Mixture 1 was essentially repeated, with the exception that 101 g (0.34 moles) of N,N'-(3,3-dimethyldicyclohexylmethane- 4,4'-diyl)-bis-tetraethyl aspartic ester (available as Desmophen™ VP LS 2973 from Bayer, Leverkusen, Gemany) was employed as a chain extender (rather than butanediol).

The resulting methacryloyl-polyfunctional polyurethaneurea was combined with the same monomer mixture used in preparing Mixture 1, in the same 40/60 weight ratio of polymer to monomers. The viscosity of the resulting polymer/monomer mixture was 10–15 mPa.s.

Mixture 3

The procedure for the preparation of Mixture 1 was essentially repeated, except that the monomer mixture was replaced with a mixture of acetoacetoxyethylmethacrylate (AAEM) and ethylene glycolmethacrylate (EGMA) in a weight ration of 2:1 (mole ratio of 1:0.45). The same polymer/monomer ratio of 40/60 by weight was employed. The resulting polymer/monomer mixture had a viscosity of 250–300 mPa.s.

Mixture 4

The procedure for the preparation of Mixture 2 was essentially repeated, except that sixty parts by weight of a monomer mixture of acetoacetoxyethylmethacrylate (AAEM) and ethylene glycolmethacrylate (EGMA) (weight ratio of 2:1, mole ratio of 1:0.45) was added to forty parts by weight of the methacryloyl-polyfunctional polyurethaneurea. The viscosity of the resulting polymer/monomer mixture was 200–250 mPa.s.

Mixture 5

A methacryloyl-polyfunctional polyurethane was prepared using essentially the procedure employed for Mixture 1. Isophorone diisocyanate (IPDI, 333 g, 1.5 moles) was placed in a flask, and a polyether diol (600 g, 0.3 mole, Therathane™ 2000 available from Du Pont) was added in two portions. Butanediol (27 g, 0.3 mole) was then added as a chain extender. Hydroxyethylmethacrylate (HEMA) was then added in the amount of 130 g (1.0 mole). Sixty parts by weight of a mixture of two monomers consisting of methyl methacrylate (MMA) and 2-ethylhexylacrylate (2-EHA) was then added to forty parts by weight of the resulting methacryloyl-polyfunctional polyurethane. The viscosity of the resulting polymer/monomer mixture was 350–400 mPa.s.

Mixture 6

The procedure for the preparation of Mixture 5 was essentially repeated, with the exception that N,N'-(3,3-dimethyldicyclohexylmethane-4,4'-diyl)-bis-tetraethyl aspartic ester (available as Desmophen™ VP LS 2379 from Bayer, Leverkusen, Germany) was employed as the chain extender (89.1 g, 0.3 mole) to form a methacryloyl-polyfunctional polyurethaneurea. The viscosity of the resulting polymer/monomer mixture was 25–40 mPa.s.

Mixture 7

The procedure for the preparation of Mixture 1 was essentially repeated, with the exception that the chain extender butanediol was omitted in preparing the methacryloyl-polyfunctional polyurethane. The viscosity of the resulting polymer/monomer mixture was 50–70 mPa.s.

Mixture 8

A methacryloyl-polyfunctional polyurethane was prepared using essentially the procedure employed for Mixture 1. Isophorone diisocyanate (IPDI, 333 g, 1.5 moles) was placed in a flask, and a polyether (1,200 g, 0.6 mole, Therathane™ 2000 from DuPont, Bad Homburg, Germany) was added in 3 portions so as not to exceed a reaction temperature of 60° C. No chain extender was employed. Hydroxyethymethacrylate (HEMA) was then added in the amount of 130 g (1.0 mole). Sixty parts by weight of a mixture of two monomers consisting of methyl methacrylate (MMA) and 2-ethylhexylacrylate (2-EHA) was added to forty parts by weight of the resulting methacryloyl-polyfunctional polyurethane. The viscosity of the resulting polymer/monomer mixture was 500–700 mPa.s.

TABLE 1

Polymer/Monomer Mixtures

| Mixture No. | Polymer Components | | | Monomer Mixture |
| --- | --- | --- | --- | --- | --- |
| | Diol | Isocyanate | Chain Extender | Monomer | |
| 1 | polycarbonate | IPDI | butanediol | HEMA | MMA/2-EHA |
| 2 | polycarbonate | IPDI | aspartic ester diamine | HEMA | MMA/2-EHA |
| 3 | polycarbonate | IPDI | butanediol | HEMA | AAEM/EGMA |
| 4 | polycarbonate | IPDI | aspartic ester diamine | HEMA | AAEM/EGMA |
| 5 | polyether | IPDI | butanediol | HEMA | MMA/2-EHA |
| 6 | polyether | IPDI | aspartic ester diamine | HEMA | MMA/2-EHA |
| 7 | polycarbonate | IPDI | — | HEMA | MMA/2-EHA |
| 8 | polyether | IPDI | — | HEMA | MMA/2-EHA | polycarbonate = polycarbonate diol (Desmophen ™ C 200, from Bayer, Leverkusen, Germany)
polyester = polycaprolactone diol (CAPA ™ 214 from Solvay, Interox, Warrington, UK)
polyether = polytetraethyleneglycol diol (Therathane ™ 2000, from Du Pont, Bad Homburg, Germany)
IPDI = isophorone diisocyanate
HEMA = 2-hydroxyethylmethacrylate
AAEM = acetoacetoxyethylmethacrylate
MMA = methyl methacrylate
2-EHA = 2-ethylhexylacrylate
EGMA = triethylene glycol methacrylate
aspartic ester diamine = N,N'-(3,3-dimethyldicyclohexylmethane-4,4'-diyl)-bis-tetraethyl aspartic ester (available as Desmophen ™ VP LS 2973 from Bayer, Leverkusen, Germany)

Filled Pavement Marking Compositions

Examples 1–6

To 30 parts by weight of one of the above-described Mixtures 1–6, was added 0.3 parts dispersion aid (available as Disperbyk™ 181 from Byk, Wesel, Germany). The dispersion aid was combined with the mixture using a slow speed propeller mixer until it was uniformly dispersed.

To the resulting mixture were added 15 parts titanium dioxide (available as CL 2310 from Kronos of Leverkusen, Germany). The resulting mixture was stirred until the pigment was well dispersed. Then 20 parts of quartz flour (available as Silbond Cristobalit Flour 3000 from Quarzwerke GmbH, Frechen, Germany) were added, and the resulting mixture was stirred until the flour filler was well dispersed. Five (5) parts of calcium metasilicate fibers (available as Nyad™ G from Nyco Minerals Europe of Charlottenlund, Denmark) were added, with stirring. Then 10 parts of aluminum oxide particles (available as Corundum™ 60 from Smyris Abrasivi of Pero, Italy) and 20 parts of solid glass beads having a refractive index of 1.5 and an average diameter of 0.4–0.8 mm (available as Potters™ 420–840 from Potters-Ballotini GmbH of Kirchheimbolanden, Germany) were added, and the resulting mixture was stirred slowly to obtain a homogeneous mixture. An adhesion promoter consisting of methacryloyloxyethylphosphate in methylmethacrylate monomer (available as adhesion promoter HP from Degussa of Wolfgang, Germany) was added in the amount of 0.2 parts by weight, along with 0.5 parts of curing accelerator N,N-dimethyl-p-toluidine. To 98 parts by weight of the resulting mixture were added 2 parts by weight of polymerization initiator comprising 50% by weight dibenzoyl peroxide in dioctylphthalate (available from Akzo, Germany). The mixture was stirred for about 2 minutes to produce a pavement marking composition ready for application to a surface.

The compositions prepared using Mixtures 1–6 are summarized in Table 2 below. Each composition was cured and tested, and the results of the testing are shown in Table 3 below.

Example 7

Example 7 was prepared in essentially the same manner as Example 2, with the exception that the portion of aluminum oxide was replaced by quartz sand (available as Silbond Cristobalits from Quarzwerke GmbH, Frechen, Germany).

Example 8

Example 8 was prepared in essentially the same manner as Example 2, with the exception that the 5 parts of Nyad™ G fibers were replaced with hollow glass microspheres (85 μm maximum diameter, available as Scotchlite™ B38/4000 from 3M Company, St. Paul, Minn., U.S.A.).

Example 9

Example 7 was prepared in essentially the same manner as Example 2, with the exception that the Nyad™ G fibers were replaced with 15 parts of quartz sand.

Comparative Examples 1 and 2

Comparative Examples 1 and 2 were prepared in essentially the same manner as Example 1, except that Mixtures 7 and 8 (containing no chain extender), respectively, were utilized.

Comparative Example 3

Comparative Example 3 was prepared by combining the additives used in Example 1 with a methacrylate-based polymer/monomer mixture (acrylate copolymer/methylmethacrylate/2-ethylhexylacrylate) commonly used in filled reactive pavement marking compositions (Degaroute™ 661 available from Agomer GmbH, Hanau, Germany).

TABLE 2

Filled Pavement Marking Compositions

| Example No. | Mixture No. (30 wt %) | TiO₂ (wt %) | Quartz Sand (wt %) | Quartz Flour (wt %) | Aluminum Oxide (wt %) | Glass Beads (wt %) | Fibers (wt %) | Glass Microspheres (wt %) |
|---|---|---|---|---|---|---|---|---|
| 1 | 1 | 15 | — | 20 | 10 | 20 | 5 | — |
| 2 | 2 | 15 | — | 20 | 10 | 20 | 5 | — |
| 3 | 3 | 15 | — | 20 | 10 | 20 | 5 | — |
| 4 | 4 | 15 | — | 20 | 10 | 20 | 5 | — |
| 5 | 5 | 15 | — | 20 | 10 | 20 | 5 | — |
| 6 | 6 | 15 | — | 20 | 10 | 20 | 5 | — |
| 7 | 2 | 15 | 10 | 20 | — | 20 | 5 | — |
| 8 | 2 | 15 | 10 | 20 | — | 20 | — | 5 |
| 9 | 2 | 15 | 15 | 20 | — | 20 | — | — |
| C1 | 7 | 15 | — | 20 | 10 | 20 | 5 | — |
| C2 | 8 | 15 | — | 20 | 10 | 20 | 5 | — |
| C3 | Degaroute™ 661 | 15 | — | 20 | 10 | 20 | 5 | — |

TABLE 3

Properties of Cured Filled Pavement Marking Compositions

| Example No. | Abrasion (mg/2000 cycles) | Adhesion to Concrete (N/mm²) | Cold Impact Resistance (J) |
|---|---|---|---|
| 1 | 227.5 | 3.0 | >21 |
| 2 | 178.8 | 4.0 | >21 |
| 3 | 376.5 | 2.0 | 16 |
| 4 | 247.6 | 2.6 | >21 |
| 5 | 227 | 3.9 | 16 |
| 6 | 189 | 4.0 | >21 |
| 7 | 328.3 | 3.6 | >21 |
| 8 | 257.0 | 2.9 | >21 |
| 9 | 337.7 | 3.5 | >21 |
| C1 | 335.4 | 2.8 | 16 |

TABLE 3-continued

Properties of Cured Filled Pavement Marking Compositions

| Example No. | Abrasion (mg/2000 cycles) | Adhesion to Concrete (N/mm$^2$) | Cold Impact Resistance (J) |
|---|---|---|---|
| C2 | 378.5 | 2.6 | 16 |
| C3 | 446.9 | 2.9 | 8 |

Test Methods for Examples 10–17 and Comparative Examples 4–6

Shore D Hardness

A 10 g sample of a mixture of polyfunctional polymer, ethylenically-unsaturated monomer, initiator, and accelerator was poured into an aluminum weighing pan and allowed to cure for at least 24 hours at 23° C. Cylindrical samples of cured resin having a diameter of about 5 cm and a thickness of at least 5 mm resulted. Shore D hardness was measured according to DIN 53 505.

E-Modulus, Tensile Strength at Break, and Elongation at Break

A 200 g sample of a mixture of polyfunctional polymer, ethylenically-unsaturated monomer, initiator, and accelerator was knife coated between two siliconized polyester films to give a thickness of about 200 microns. The resulting thin coating was allowed to cure between the two liners at 23° C. for at least 24 hours. E-modulus, tensile strength, and elongation were then measured using a tensile tester according to DIN 53 455.

Cold Impact Resistance

Sample preparation: Cured film samples having a thickness of approximately 200 microns were prepared essentially as described above for the measurement of E-modulus, tensile strength, and elongation. The resulting film samples were adhered to an aluminum panel (15 cm×5 cm) using Adhesive Transfer Tape 9457 (available from 3M Company, St.Paul, Minn., U.S.A.). The aluminum panel was placed in a freezer at a temperature of –20° C. for 12 hours.

Test: The panel was removed from the freezer, and a cold impact test was performed according to ASTM (American Society for Testing and Materials) Method D-1709/75. The highest impact energy that failed to damage the surface of the film sample was recorded in Joules.

Abrasion

Sample preparation: Cured films having a thickness of about 200 microns were prepared essentially as described above for the measurement of E-modulus, tensile strength, and elongation. A 10 cm×10 cm sample was then cut from each film.

Test: An abrasion wheel H22 was employed according to the method DIN 53754 at a rate of 70 revolutions per minute for 500 revolutions (10 minutes). Each sample was weighed before and after abrasion. Before weighing after abrasion, the surface of each sample was cleaned with a soft brush to remove any abraded portion of the sample. The test procedure was repeated four times, and the results were averaged and normalized to 2000 revolutions. The results are reported in grams of sample lost per 2000 revolutions.

Preparation of Aspartic Ester Polyamines

Preparation of Aspartic Ester Polyamine 1 (AEP 1)

Maleic acid diethylester (2.0 moles, 344 g) was placed in a 1 liter, four-necked flask equipped with a thermometer, a mechanical stirrer, an inert gas inlet, a reflux condenser, and a dropping funnel. O,O'-Bis-(2-aminopropyl)-polypropyleneglycol 300 (1.0 mole, 400 g, available as Jeffamine™ D-400 from Huntsman Corp. Europe, Zaventem, Belgium) was added dropwise starting at a temperature of 20° C. The reaction temperature was not allowed to exceed 50° C. and was held at 50° C. for 48 hours.

Preparation of Aspartic Ester Polyamines 2–5 (AEP 2–5)

Three other aspartic ester polyamines (AEP 2–4) were prepared in essentially the same manner as for AEP 1 by allowing maleic acid diethyl ester to react with the diamines shown in Table 4. AEP 5 (which can be prepared by the same method) was purchased from Bayer, Leverkusen, Germany in the form of Desmophen™ VP LS 2973.

TABLE 4

Aspartic Ester Polyamines

| | Aspartic Ester Polyamine | Diamine Used to Prepare Aspartic Ester Polyamine | NH Equiv. weight of Diamine |
|---|---|---|---|
| AEP 1 | N,N'-(bis-2-propyl) polypropylene-glycol 300-O,O'-diyl)-bis-tetraethyl aspartic ester | O,O'-bis-(2-aminopropyl)-polypropylene glycol 300 | 416 |
| AEP 2 | N,N'-(butyl-1,4-diyl)-bis-tetraethyl aspartic ester | 1,4-butyldiamine | 209 |
| AEP 3 | N,N'-(2,2-dimethyl-propane-1,3-diyl)-bis-tetraethyl aspartic ester | 1,3-diamino-2,2-dimethyl propane | 225.7 |
| AEP 4 | N,N'-(2,4-dimethyl-hexane-1,6-diyl)-bis-tetraethyl aspartic ester | 1,6-diamino-2,4-dimethyl hexane | 243.6 |
| AEP 5 | N,N'-(3,3-dimethyldicyclohexyl-methane-4,4'-diyl)-bis-tetraethyl aspartic ester | 4,4'-diamino-3,3'-dimethyl dicyclohexyl methane | 291 |

Polyfunctional Polymer 1

5.0 moles (1110 g) of isophorone diisocyanate (IPDI, NCO equivalent weight of 111) was placed in a 5 liter, four-necked flask equipped with a thermometer, a mechanical stirrer, an inert gas inlet, and a reflux condenser. Then 2.0 OH equivalents (2,126 g) of polycarbonatediol (OH equivalent weight of 1063, available as Desmophen™ C 200 from Bayer, Leverkusen) was added to the flask in three portions, so as not to exceed a reaction temperature of 60° C. Two NH equivalents (418 g, 1 mole) of N,N'-(butyl-1,4-diyl)-bis-tetraethyl aspartic ester (AEP 2 in Table 1 above) were then added slowly in four portions, and the resulting mixture was held at 50° C. for 2 hours. The mixture was allowed to cool to 23° C., and the isocyanate concentration of the mixture was measured by titration according to DIN 53 185. A calculated equimolar amount (with 10% excess) of 2-hydroxyethylmethacrylate (HEMA), corresponding to 6.6 moles (858 g) was added using a dropping funnel. The resulting mixture was then maintained at 50° C. for 8 hours. The residual NCO in the resulting methacryloyl-polyfunctional polyurethaneurea product was measured (using the di-(n-butylamine) titration method according to DIN 53 185) and found to be less than 0.1%. The product was placed in glass bottles for storage.

Polyfunctional Polymer 2

The procedure for Polyfunctional Polymer 1 was essentially repeated, with the exception that 451.4 g (2 NH equivalents, 1 mole) of N,N'-(2,2-dimethyl propane-1,3-diyl)-bis-tetraethyl aspartic ester (AEP 3 in Table 4 above) was used as the chain extender.

Polyfunctional Polymer 3

The procedure for Polyfunctional Polymer 1 was essentially repeated, with the exception that 832 g (2 NH equivalents) of N,N'-(bis-2-propyl)polypropyleneglycol 300-O,O'-diyl)-bis-tetraethyl aspartic ester (AEP 1 in Table 4) was used as the chain extender.

Polyfunctional Polymer 4

The procedure for Polyfunctional Polymer 1 was essentially repeated, with the exception that the chain extender employed was N,N'-(2,4-dimethyl hexane-1,6-diyl)-bis-tetraethyl aspartic ester (243.6 g, AEP 4 in Table 4).

Polyfunctional Polymer 5

The procedure for Polyfunctional Polymer 1 was essentially repeated, with the exception that the chain extender employed was N,N'-(3,3-dimethyldicyclohexylmethane-4,4'-diyl)-bis-tetraethyl aspartic ester (291 g, AEP 5 in Table 4 above).

Polyfunctional Polymer 6

5.0 moles (916.6 g) of 2,4-toluene diisocyanate (2,4-TDI, NCO equivalent weight of 91.7) was placed in a 5 liter, four-necked flask equipped with a thermometer, a mechanical stirrer, an inert gas inlet, and a reflux condenser. Polycaprolactone diol (2.0 OH equivalents, 1000 g, available as CAPA™ 214 from Solvay, Warrington, GB) was added to the flask in three portions, so as not to exceed a reaction temperature of 60° C. N,N'-(3,3-dimethyldicyclohexylmethane-4,4'-diyl)-bis-tetraethyl aspartic ester (291 g, 2 NH equivalents, AEP 5 in Table 4) was then added slowly in 4 portions, and the resulting mixture was held at 50° C. After two hours, the isocyanate concentration of the mixture was measured by titration according to DIN 53 185. A calculated equilmolar amount (with 10% excess, corresponding to 6.6 moles, 858 g) of 2-hydroxyethylmethacrylate (HEMA) was added using a dropping funnel. The resulting mixture was then maintained at 50° C. for 8 hours. The residual NCO content of the resulting methacryloyl-polyfunctional polyurethaneurea product was measured and found to be less than 0.1%. The product was placed in glass bottles for storage.

Polyfunctional Polymer 7

5.0 moles (1110 g) of isophorone diisocyanate (IPDI, NCO equivalent weight of 111) was placed in a 5 liter, four-necked flask equipped with a thermometer, a mechanical stirrer, an inert gas inlet, and a reflux condenser. Then 2.0 OH equivalents (2000 g, OH equivalent weight of 1000) of polytetraethylene glycol (available as Therathane™ 2000, from Du Pont, Bad Homburg, Germany) was added to the flask in three portions, so as not to exceed a reaction temperature of 60° C. N,N'-(3,3-dimethyldicyclohexylmethane-4,4'-diyl)-bis-tetraethyl aspartic ester (291 g, 2 NH equivalents, AEP 5 in Table 4) was then added slowly in four portions, and the resulting mixture was held at 50° C. After two hours, the isocyanate concentration of the mixture was measured by titration according to DIN 53 185. A calculated equilmolar amount (with 10% excess, corresponding to 6.6 moles, 858 g) of 2-hydroxyethylmethacrylate (HEMA) was added using a dropping funnel. The resulting mixture was then maintained at 50° C. for 8 hours. The residual NCO in the resulting methacryloyl-polyfunctional polyurethaneurea product was measured and found to be less than 0.1%. The product was placed in glass bottles for storage.

Polyfunctional Polymer 8

The procedure for Polyfunctional Polymer 1 was essentially repeated, with the exception that the aspartic ester diamine chain extender was replaced with 1 mole (90 g) of butanediol.

TABLE 5

Polyfunctional Polymers

| Polymer No. | Diol | Isocyanate | Chain Extender | Monomer | Viscosity (kPa.s) |
|---|---|---|---|---|---|
| 1 | Polycarbonate | IPDI | AEP 2 | HEMA | 7 |
| 2 | Polycarbonate | IPDI | AEP 3 | HEMA | 7.5 |
| 3 | Polycarbonate | IPDI | AEP 1 | HEMA | 6 |
| 4 | Polycarbonate | IPDI | AEP 4 | HEMA | 5.5 |
| 5 | Polycarbonate | IPDI | AEP 5 | HEMA | 6 |
| 6 | Polyester | TDI | AEP 5 | HEMA | 8 |
| 7 | Polyether | IPDI | AEP 5 | HEMA | 9 |
| 8 | Polycarbonate | IPDI | Butanediol | HEMA | 50 | polycarbonate = polycarbonate diol (Desmophen ™ C200, from Bayer, Leverkusen, Germany)
polyester = caprolactone diol (available as CAPA ™ 214 from Solvay Interox Ltd, Warrington, GB)
polyether = polytetraethylene glycol diol (Therathane ™ 2000, from DuPont, Bad Homburg, Germany)
IPDI = isophorone diisocyanate
TDI = toluene diisocyanate
HEMA = 2-hydroxyethylmethacrylate

Unfilled Pavement Marking Compositions

The above-described polyfunctional polymers were combined with ethylenically unsaturated monomers and the resulting unfilled pavement marking compositions cured and tested, as described below:

Examples 10–13

The uncured Polyfunctional Polymer 5 was combined with the monomers shown in Table 6 below, and the resulting mixture was stirred until a homogeneous mixture was obtained. Benzoyl peroxide (available as Cadox™ from Akzo Chemicals) was added to the mixture in the amount of 2 parts by weight, along with 0.5 parts of N,N-dimethyl-p-toluidine, and the resulting mixture was stirred until the additives were dissolved. The mixture was knife coated between two siliconized polyester films and allowed to polymerize at a temperature of 23° C. for 15 minutes. The cured compositions were then tested, and the results are shown in Table 7 below.

Examples 14–16

The uncured Polyfunctional Polymer 6 was combined with the monomers shown in Table 6 below, and the resulting mixture was stirred until a homogeneous mixture was obtained. Benzoyl peroxide (available as Cadox™ from Akzo Chemicals) was added to the mixture in the amount of 2 parts by weight, along with 0.5 parts of N,N-dimethyl-p-toluidine, and the resulting mixture was stirred until the additives were dissolved. The mixture was knife coated between two siliconized polyester films and allowed to polymerize at a temperature of 23° C. for 15 minutes. The cured compositions were then tested, and the results are shown in Table 7 below.

Example 17

The uncured Polyfunctional Polymer 7 was combined with the monomers shown in Table 6 below, and the resulting mixture was stirred until a homogeneous mixture was obtained. Benzoyl peroxide (available as Cadox™ from Akzo Chemicals) was added to the mixture in the amount of 2 parts by weight, along with 0.5 parts of N,N-dimethyl-p-toluidine, and the resulting mixture was stirred until the additives were dissolved. The mixture was knife coated between two siliconized polyester films and allowed to polymerize at a temperature of 23° C. for 15 minutes. The cured compositions were then tested, and the results are shown in Table 7 below.

Comparative Example 4

Methyl methacrylate monomer was polymerized by free-radical polymerization using essentially the procedure used for Examples 10–13 (except including partial polymerization to obtain a coatable viscosity).

Comparative Example 5

A mixture of methyl methacrylate (MMA) and 2-ethyl hexyl acrylate (2-EHA) in a weight ratio of 2:1 was polymerized using essentially the method used for Comparative Example 4.

Comparative Example 6

Polyfunctional Polymer 8 (40 weight percent) was combined with methyl methacrylate (MMA) (60 weight percent) and polymerized using essentially the method used for Examples 10–13.

Various modifications and alterations of this invention will become apparent to those skilled in the art without departing from the scope and spirit of this invention.

What is claimed is:

1. A pavement marking composition comprising (a) a polyfunctional ethylenically unsaturated polymer selected from the group consisting of polyfunctional ethylenically unsaturated polyureas, polythiocarbamateureas, and polyurethaneureas comprising at least one aspartic ester polyaimine-derived segment and at least one polycarbonate, polyether, or polyestor segment; and (b) at least one ethylenically unsaturated monomer.

2. The composition of claim 1 wherein said polyfunctional ethylenically unsaturated polymer is a polyfunctional ethylenically unsaturated polyurea or polyurethaneurea.

3. The composition of claim 1 wherein said polyfunctional ethylenically unsaturated polymer comprises at least one polycarbonate or polyester segment.

4. The composition of claim 1 wherein said aspartic ester polyamine is represented by the following formula:

TABLE 6

Unfilled Pavement Marking Compositions

| Example No. | Polyfunctional Polymer No. | Amount of Polymer (weight percent) | Monomer 1 | Amount of Monomer 1 (weight percent) | Monomer 2 | Amount of Monomer 2 (weight percent) |
|---|---|---|---|---|---|---|
| 10 | 5 | 40 | MMA | 40 | 2-EHA | 20 |
| 11 | 5 | 40 | AAEM | 40 | EGMA | 20 |
| 12 | 5 | 40 | AAEM | 40 | IBA | 20 |
| 13 | 5 | 40 | MMA | 60 | 0 | 0 |
| 14 | 6 | 40 | AAEM | 60 | 0 | 0 |
| 15 | 6 | 40 | MMA | 40 | 2-EHA | 20 |
| 16 | 6 | 40 | MMA | 60 | 0 | 0 |
| 17 | 7 | 40 | MMA | 40 | 2-EHA | 20 |
| C4 | None | None | MMA | 100 | 0 | 0 |
| C5 | None | None | MMA | 66 | 2-EHA | 34 |
| C6 | 8 | 40 | MMA | 60 | 0 | 0 |

TABLE 7

Properties of Cured Unfilled Pavement Marking Compositions

| Example No. | Cold Impact Resistance (J) | Abrasion (mg/2000 cycles) | Shore D hardness | Stress at Yield Point (MPa) | Elongation at Break (%) | E-Modulus (MPa) |
|---|---|---|---|---|---|---|
| 10 | >21 | 21 | 12 | 13.6 | 106 | 206 |
| 11 | >21 | 18 | 22 | 1.3 | 73 | 5 |
| 12 | >21 | 35 | 15 | 1.4 | 83 | 10 |
| 13 | 16 | 72 | 62 | — | 28 | 521 |
| 14 | 16 | 56 | 47 | 3.0 | 46 | 20 |
| 15 | 16 | 36 | 70 | 27.0 | 41 | 563 |
| 16 | 16 | 98 | 86 | — | 19.5 | 824 |
| 17 | >21 | 34 | 10 | 2.1 | 121 | 189 |
| C4 | <2 | 423 | 89 | — | 5.2 | 2840 |
| C5 | 4 | 386 | 77 | — | 10.9 | 685 |
| C6 | 8 | 196 | 52 | 17.0 | 21 | 387 |

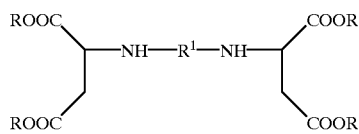

wherein R¹ is a divalent organic group that has from 1 to about 40 carbon atoms and each R is independently an organic group that has from 1 to about 40 carbon atoms and that is inert toward isocyanate groups at temperatures of 100° C. or less.

5. The composition of claim 4 wherein said R¹ is a branched, unbranched, or cyclic aliphatic group and each said R is independently a branched or unbranched alkyl group having from 1 to about 20 carbons.

6. The composition of claim 5 wherein each said R is independently a lower alkyl group having from 1 to about 4 carbon atoms.

7. The composition of claim 1 wherein said aspartic ester polyamine is selected from the group consisting of N,N'-(4,4'-dicyclohexylmethane-diyl)bis tetraethyl asparlic ester, N,N'-(hexane-1,6-diyl)bis tetraethyl aspartic ester, N,N'-(2-methylpentane-1,5-diyl)tetrabutyl aspartic ester, N,N'-(3,3-dimethyldicyclohexylmethane-4,4'-diyl)-bis-tetraethyl aspartic ester, N,N'-(bis-2-propyl)polypropyleneglycol 300-O,O '-diyl-bis-tetraethyl aspartic ester, N,N'-(butyl-1,4-diyl)-bis-tetraethyl aspartic ester, N,N'-(2,2-dimethylpropane-1,3-diyl)-bis-tetraethyl aspartic ester, N,N'-(2,4-dimethylhexane-1,6-diyl)-bis-tetraethyl aspartic ester, and mixtures thereof.

8. The composition of claim 1 wherein said ethylenically unsaturated monomer is a (meth)acryloyl-functional monomer.

9. The composition of claim 8 wherein said (meth)acryloyl-functional monomer is selected from the group consisting of ethyl acrylate, n-butyl acrylate, isobutyl acrylate, t-butyl acrylate, methyl methacrylate, ethyl methacrylate, butyl methacrylate, ethyltriglycol methacrylate, isobornyl acrylate, 2-(((butylamino)carbonyl)oxy)ethyl acrylate, acetoacetoxyethyl methacrylate, acetoacetoxyethyl acrylate, acetoacetoxypropyl acrylate, acetoacetoxybutyl acrylate, 2-methyl-2-(3-oxo-butyrylamino)-propyl methacrylate, 2-ethylhexyl acrylate, and mixtures thereof.

10. The composition of claim 1 wherein said ethylenically unsaturated monomer has a molecular weight greater than about 150.

11. The composition of claim 1 further comprising at least one additive selected from the group consisting of initiators, accelerators, drying waxes, extenders, fillers, pigments, and reflective elements.

12. A pavement marking comprising the cured composition of claim 1.

13. A pavement marking composition comprising (a) a polyfunctional ethylenically unsaturated polymer comprising the reaction product of (i) at least one polyisocyanate; (ii) at least one hydroxyl-, thio-, or secondary amino-polyfunctional polycarbonate, polyether, or polyester; (iii) at least one isocyanate-reactive aspartic ester polyamine chain extender; and (iv) at least one ethylenically unsaturated monomer having additional functionality that is reactive with isocyanate; and (b) at least one ethylenically unsaturated monomer.

14. A pavement marking comprising the cured composition of claim 13.

15. A pavement marking composition comprising (a) a (meth)acryloyl-polyfunctional polyurethaneurea comprising (i) at least one segment derived from an aspartic ester diamine and (ii) at least one polycarbonate segment; and (b) at least one (meth)acryloyl-functional monomer.

16. A pavement marking comprising the cured composition of claim 15.

17. A trafficable surface bearing the pavement marking of claim 16.

18. A process for marking or for applying a pavement marking comprising the step of applying to a trafficable surface the composition of claim 15.

19. A pavement bearing a pavement marking comprising a composition comprising (a) a polyfunctional ethylenically unsaturated polymer selected from the group consisting of polyfunctional ethylenically unsaturated polyurethanes, polyureas, polythiocarbamates, polythiocarbamateurethanes, polythiocarbamateureas, and polyurethaneureas comprising at least one chain extender-derived segment and at least one polycarbonate, polyether, or polyester segment; and (b) at least one ethylenically unsaturated monomer; said composition having been cured.

20. A pavement bearing a pavement marking comprising a composition comprising (a) a polyfunctional ethylenically unsaturated polymer comprising the reaction product of (i) at least one polyisocyanate; (ii) at least one hydroxyl-, thio-, or secodary amino-polyfunctional polycarbonate, polyether, or polyester; (iii) at least one isocyanate-reactive polyfunctional chain extender; and (iv) at least one ethylenically unsaturated monomer having additional functionality that is reactive with isocyanate; and (b) at least one ethylenically unsaturated monomer; said composition having been cured.

21. A process for marking or for applying a pavement marking comprising the step of applying to a pavement a composition comprising (a) a polyfunctional ethylenically unsaturated polymer selected from the group consisting of polyfunctional ethylenically unsaturated polyurethanes, polyureas, polythiocarbamates, polythiocarbamateurethanes, polythiocarbamateureas, and polyurethaneureas comprising at least one chain extender-derived segment and at least one polycarbonate, polyether, or polyester segment; and (b) at least one ethylenically unsaturated monomer.

22. A process for marking or for applying a pavement marking comprising the step of applying to a pavement a composition comprising (a) a polyfunctional ethylenically unsaturated polymer comprising the reaction product of (i) at least one polyisocyanate; (ii) at least one hydroxyl-, thio-, or secondary amino-polyfunctional polycarbonate, polyether, or polyester; (iii) at least one isocyanate-reactive polyfunctional chain extender; and (iv) at least one ethylenically unsaturated monomer having additional functionality that is reactive with isocyanate; and (b) at least one ethylenically unsaturated nonomer.

* * * * *

UNITED STATES PATENT AND TRADEMARK OFFICE
CERTIFICATE OF CORRECTION

PATENT NO. : 6,350,823 B1
DATED : February 26, 2002
INVENTOR(S) : Goeb, Siegfried R.

It is certified that error appears in the above-identified patent and that said Letters Patent is hereby corrected as shown below:

Title page,
Item [56], References Cited, OTHER PUBLICATIONS, delete "NO." and insert in place thereof -- No --.

Column 13,
Line 12, delete "Gemany" and insert in place thereof -- Germany --.

Column 23,
Line 23, delete "asparlic" and insert in place thereof -- aspartic --.

Column 24,
Line 32, delete "secodary" and insert in place thereof -- secondary --.
Line 59, delete "nonomer" and insert in place thereof -- monomer --.

Signed and Sealed this

Twelfth Day of November, 2002

Attest:

Attesting Officer

JAMES E. ROGAN
Director of the United States Patent and Trademark Office